United States Patent
Kurz

(10) Patent No.: US 11,474,248 B2
(45) Date of Patent: Oct. 18, 2022

(54) METHOD AND DEVICE FOR DETECTING AN OBJECT BY MEANS OF A BROADBAND LASER PULSE

(71) Applicant: Volkswagen Aktiengesellschaft, Wolfsburg (DE)

(72) Inventor: Heiko Gustav Kurz, Hannover (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 812 days.

(21) Appl. No.: 16/425,026

(22) Filed: May 29, 2019

(65) Prior Publication Data

US 2019/0369250 A1    Dec. 5, 2019

(30) Foreign Application Priority Data

May 31, 2018    (DE) ..................... 10 2018 208 669.9

(51) Int. Cl.
*G01S 17/89*    (2020.01)
*G01S 7/481*    (2006.01)
(Continued)

(52) U.S. Cl.
CPC ............. *G01S 17/89* (2013.01); *G01S 7/484* (2013.01); *G01S 7/4815* (2013.01); *G01S 7/497* (2013.01); *G01S 17/26* (2020.01)

(58) Field of Classification Search
CPC ............................... G01S 7/4815; G01S 7/484
See application file for complete search history.

(56) References Cited

U.S. PATENT DOCUMENTS

| 2003/0043058 A1 | 3/2003 | Jamieson et al. ............. 340/961 |
| 2006/0244945 A1 | 11/2006 | Yamaguchi et al. ......... 356/5.03 |

(Continued)

FOREIGN PATENT DOCUMENTS

| DE | 102016009926 A1 | 2/2017 | ............... G01C 3/08 |
| EP | 2453253 A1 | 5/2012 | ............. G01S 17/42 |
| WO | 2014/094119 A1 | 6/2014 | ............. G01S 7/481 |

OTHER PUBLICATIONS

German Office Action, Application No. 102018208669.9, 6 pages, dated Feb. 19, 2019.

(Continued)

*Primary Examiner* — Jerry T Jean Baptiste
(74) *Attorney, Agent, or Firm* — Slayden Grubert Beard PLLC

(57) ABSTRACT

A method and a device for detecting an object using broadband laser pulses with a given wavelength distribution, pulse duration and repetition frequency which is suitable for use in a motor vehicle comprise the steps:

emit broadband laser pulses, generate a stretched pulse from each broadband laser pulse by applying an angle dispersion to the broadband laser pulse, whereby the different wavelengths of the broadband laser pulse are spread into different angles detect a reflected subsection of the stretched pulse which is reflected by the object arranged in the stretched pulse, determine the wavelengths in the reflected subsection of the stretched pulse, determine the runtime of the stretched pulse from the dispersive element to the object using a time-of-flight method, and (Continued)

determine the distance and the width of the object as a function of the runtime of the stretched pulse and the wavelength range of the reflected subsection of the stretched pulse.

12 Claims, 2 Drawing Sheets

(51) Int. Cl.
  *G01S 7/484* (2006.01)
  *G01S 7/497* (2006.01)
  *G01S 17/26* (2020.01)

(56) References Cited

U.S. PATENT DOCUMENTS

| | | | |
|---|---|---|---|
| 2007/0177841 A1 | 8/2007 | Danziger | 385/28 |
| 2008/0273190 A1 | 11/2008 | Smith | 356/4.01 |
| 2009/0142066 A1 | 6/2009 | Leclair et al. | 398/139 |
| 2010/0296077 A1 | 11/2010 | Scott et al. | 356/4.01 |
| 2014/0085622 A1* | 3/2014 | Wong | G01J 3/2823 356/5.04 |
| 2015/0049326 A1* | 2/2015 | Lundquist | G01S 7/483 356/5.01 |
| 2017/0090031 A1 | 3/2017 | Bondy et al. | 356/5.01 |
| 2017/0261612 A1 | 9/2017 | Akiyama | |
| 2017/0307736 A1 | 10/2017 | Donovan | |

OTHER PUBLICATIONS

Wang, Yu Winston et al., " Multiplexed Optical Imaging of Tumor-Directed Nanoparticles: A Review of Imaging Systems and Approaches," Nanotheranostics, vol. 1(4), pp. 369-388, Aug. 19, 2017.

* cited by examiner

METHOD AND DEVICE FOR DETECTING AN OBJECT BY MEANS OF A BROADBAND LASER PULSE

CROSS-REFERENCE TO RELATED APPLICATIONS

This application claims priority to German Patent Application No. DE 10 2018 208 669.9, filed on May 31, 2018 with the German Patent and Trademark Office. The contents of this application are incorporated herein for all purposes.

TECHNICAL FIELD

The invention relates to a method for detecting an object by means of a broadband laser pulse, a corresponding device, as well as the use of the method, or respectively the device, in a motor vehicle for recording objects in the environment of the motor vehicle by means of lidar.

BACKGROUND

Extremely reliable perception of the environment is absolutely essential for automated driving. In doing so, the environment is recorded with the assistance of sensors such as radar, lidar and/or a camera. Comprehensive 360° 3D recording of the environment is particularly important so that all of the static and dynamic objects can be recorded. Especially, lidar plays a supportive role in the redundant, robust recording of the environment since this type of sensor can precisely measure distances when recording the environment and can also be used for classification. However, these sensors are expensive and have a complex design. In particular, 360° 3D environmental recording is problematic since either many smaller individual sensors are needed that generally work with many individual light sources and detector elements, or large sensors are used which lead to problems in a motor vehicle. Moreover, the spatial dimensions of the smaller sensor types as well lie within the range of volume of at least one liter and therefore do not permit a visible installation position in the motor vehicle.

Furthermore, the data individually collected by each sensor must be individually processed and/or fused. In doing so, precise time stamping for real-time processing is particularly important, which additionally makes data recording and classification more complex.

A combination of many individual sensors is moreover particularly error-prone. Accordingly during the operation of lidars, especially the use of mechanical components to pivot the laser has proven to be a major source of failure. With sensors having several light sources or laser diodes, individual components repeatedly fail so that the precision of environmental recording is reduced.

Generally, many individual sensors with overlapping ranges of vision are therefore combined in order to achieve 360° 3D environmental recording. In doing so, mechanical, rotating, or deflecting elements are used for light deflection, or respectively laser deflection. MEMS mirror arrays or phased arrays are also occasionally used.

In order to be able to realize environmental recording without a mechanical deflection device, flash lidars are used that completely illuminate the environment within their range of vision.

The document EP 2 453 253 A1 describes a multidirectional sensor system with a light source for generating a beam of electromagnetic radiation and a transmitter for transmitting the electromagnetic radiation to a target. In this case, the transmitter can have a plurality of optical fibers that are designed to capture the electromagnetic radiation and have a surface on which an end of the plurality of optical fibers terminates in different directions and/or orientations in order to emit the electromagnetic radiation.

The document US 20030043058 A1 describes a warning system based on the use of distributed lasers for recording obstacles in the environment of an airplane with a plurality of obstacle-detecting sensors which are arranged at corresponding positions of the airplane in order to send laser energy in a predetermined spatial region and to detect laser energy reflected by an obstacle, a laser source for emitting a laser beam along an optical path, and a plurality of bistable optical channels. Each optical channel comprises a plurality of optical fibers and at least one receiving fiber, and extends from the laser source to the corresponding obstacle-detecting sensors in order to direct the laser beam from its optical path to the obstacle-detecting sensors for emitting into the corresponding spatial region, and a light detector. Laser energy that is reflected by an obstacle and received by any of the obstacle-detecting sensors is directed by the receiving fibers of the corresponding optical channel to the light detector for detecting the obstacle within the corresponding spatial region.

The document US 20070177841 A1 describes a so-called LADAR system having an optical detector arrangement which defines a current optical field of vision.

A lighting system of the system without movable components transmits a pulsed light at different times to each of a plurality of subregions of the current optical field of vision, and a detection system with at least one sensor detects the reflection of the light from the at least one subregion of the current optical field of vision. Each of the detection subregions overlaps the illuminated subregions so that the overlap of each of the illuminated subregions with the detected subregions defines a LADAR pixel whose resolution is better than that of the detected subregions.

The document US 20140085622 A1 describes a system of a three-dimensional hyperspectral image comprising a lighting source for illuminating a target object, a dispersive element for spectrally separating the light received from the target object into different colors, and an image sensor in the form of a focal plane array for light detection and region determination. In so doing, spatial information with respect to the target object in a spatial direction in the plane of the focal plane array, spectral information relating to a spatial direction in the plane of the focal plane array perpendicular thereto, and spacing information from time-of-flight measurements with respect to at least two wavelengths are obtained, whereby the target object is imaged in three dimensions, and spectral information is obtained from at least one 3D point.

The known systems have the following disadvantages:
- installation of a plurality of individual sensors is necessary,
- large spatial dimensions of the sensors do not permit hidden installation,
- mechanical deflection devices are unreliable,
- a great deal of effort is required for synchronizing the individual sensors,
- data fusion is involved and error-prone since there is no central data recording and light generation,
- the individual sensors have small ranges of vision; larger ranges of vision have only been possible to date using mechanical deflection devices, the systems are very expensive, flash lidars have a small range, and with flash lidars, safety is uncertain for the eyes of individuals in the environment.

SUMMARY

An object of the invention is therefore to create a simplified and robust method and a corresponding device for detecting objects, in particular those in the environment of a motor vehicle.

The object is solved by a method for detecting an object using broadband laser pulses and by a corresponding device having the features of the respective independent claims. Various embodiments of the invention are discussed in the dependent claims and the following specification.

In one aspect, a method of detecting an object using broadband laser pulses with a given bandwidth and wavelength distribution, pulse duration and repetition frequency comprises the steps:

emitting broadband laser pulses, generating a stretched pulse from each broadband laser pulse by applying an angle dispersion to the broadband laser pulse, whereby the different wavelengths of the broadband laser pulse are spread into different angles, detecting a reflected subsection of the stretched pulse which is reflected by the object arranged in the stretched pulse, determining the wavelengths in the reflected subsection of the stretched pulse, i.e., the reflected bandwidth of the subsection, determining the runtime of the stretched pulse from the dispersive element to the object using a time-of-flight method, and determining the distance and the width of the object as a function of the runtime of the stretched pulse and the wavelength range of the reflected subsection of the stretched pulse, i.e., the reflected bandwidth.

In another aspect, a device for detecting an object using broadband laser pulses at a given bandwidth and wavelength distribution, pulse duration and repetition frequency is provided. The device of this aspect is configured and designed to perform the method described above, and comprises:

a LIDAR system for generating broadband laser pulses, at least one dispersion apparatus for applying an angle dispersion to the laser pulses to generate stretched pulses, a spectral detector for ascertaining the wavelengths in the reflected subsection of the stretched pulse, i.e., the bandwidth of the reflected subsection, an apparatus for determining the runtime of the stretched pulse between the dispersion apparatus and the object, and an apparatus for determining the distance and the width of the object relative to the dispersion apparatus from the runtime and the wavelength range of the reflected subsection of the stretched pulses.

DETAILED DESCRIPTION

Figure 1:
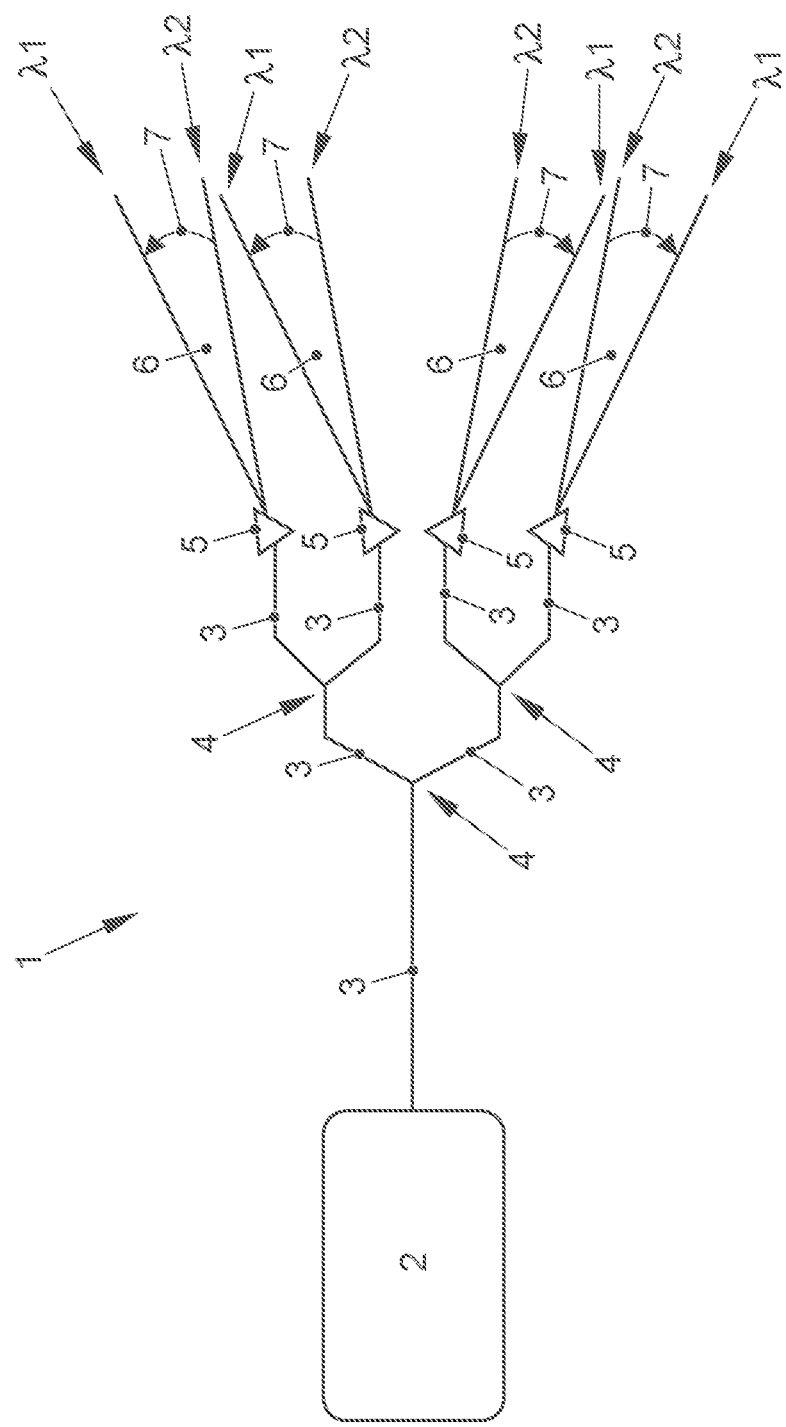
FIG. 1 shows a schematic representation of the lidar emission system of a motor vehicle.

As discussed in the preceding and in one aspect, a method of detecting an object using broadband laser pulses with a given bandwidth and wavelength distribution, pulse duration and repetition frequency is provided. In some embodiments, the method comprises the steps of emitting broadband laser pulses, generating a stretched pulse from each broadband laser pulse by applying an angle dispersion to the broadband laser pulse, whereby the different wavelengths of the broadband laser pulse are spread into different angles, detecting a reflected subsection of the stretched pulse which is reflected by the object arranged in the stretched pulse, determining the wavelengths in the reflected subsection of the stretched pulse, i.e., the reflected bandwidth of the subsection, determining the runtime of the stretched pulse from the dispersive element to the object using a time-of-flight method, and determining the distance and the width of the object as a function of the runtime of the stretched pulse and the wavelength range of the reflected subsection of the stretched pulse, i.e., the reflected bandwidth.

In some embodiments, the wavelengths of the broadband laser pulses lie within a range of 400 nm to 4 μm. In this case, the used wavelength range normally comprises a section of the aforementioned range and depends on the used light source. In other words, the bandwidth of the laser pulse lies within the aforementioned range.

In some embodiments, the illuminated angle of the stretched pulse lies within a range of 0.1° to 180°. In this case as well, the actually used angle before lighting the environment depends on the current application and used light.

In some embodiments, there is a calibration of the wavelengths in the stretched pulse to the angle of spatial deflection generated by the angle dispersion so that a clear assignment of the angle to the wavelength of the stretched pulse is ensured.

In some embodiments, the wavelength range of the reflected subsection is determined by the spectral limits of the reflected subsection. In other words, the bandwidth of the reflected subsection is determined.

In another aspect, a device for detecting an object using broadband laser pulses at a given bandwidth and wavelength distribution, pulse duration and repetition frequency, is provided. In some embodiments, the device is configured and designed to perform the method described above and/or comprises:

a LIDAR system for generating broadband laser pulses, at least one dispersion apparatus for applying an angle dispersion to the laser pulses to generate stretched pulses, a spectral detector for ascertaining the wavelengths in the reflected subsection of the stretched pulse, i.e., the bandwidth of the reflected subsection, an apparatus for determining the runtime of the stretched pulse between the dispersion apparatus and the object, and an apparatus for determining the distance and the width of the object relative to the dispersion apparatus from the runtime and the wavelength range of the reflected subsection of the stretched pulses.

In some embodiments, the dispersion apparatus is formed by a dispersive element. A prism, a grid or the like is possible as the dispersive element.

In some embodiments, the spectral detector is formed by a spectrometer or a multi-spectral camera, wherein the enumeration is not to be understood restrictively. Other suitable spectral detectors may also be used.

In some embodiments, the device has a plurality of splitters that split the broadband laser pulse into a corresponding plurality of laser pulses. The individual laser pulse is therefore split by the splitter into a corresponding plurality of laser pulses which have the same broadband properties of the original entry pulse and are conducted via corresponding optical fibers.

In some embodiments, a plurality of dispersion apparatuses generates a plurality of stretched pulses from the plurality of laser pulses so that the generated stretched pulses may be used to detect objects in different spatial regions. In other words, a plurality is generated of stretched pulses that emit in different solid angles.

In some embodiments, the laser pulses are connected to the dispersion apparatuses via optical fibers. In other words, a broadband laser pulse generated by a lidar system is fed to the splitters and the downstream dispersion apparatuses by optical fibers which renders light delivery robust.

In another aspect, use of the device explained above, and hence the method as well, occurs in a motor vehicle in order to determine objects in the environment of the motor vehicle.

The method and device described according to embodiments herein are based on the use of a broadband light source of a given bandwidth that emits short laser pulses. To accomplish this and in some embodiments, for example mode-locked laser systems, fiber lasers and/or other sources of coherent radiation with a sufficient bandwidth may be used. These broadband laser pulses are divided by means of a glass fiber and optical splitters into a plurality of emitters. Each of the individual glass fibers represents a sensor emitter that emits coherent, broadband radiation. Located at each fiber end is a dispersive optical element or a dispersion apparatus such as a prism; this may, however, be replaced by another dispersive element such as a grid, bulk material, or the like. A direct application of an optical grid on the fiber end, or respectively on an optical taper attached to the fiber end is also conceivable in some embodiments. An angular dispersion may be applied to the pulse by the dispersive element, which is also termed an angular chirp that causes a spatial expansion of the light pulse into a stretched pulse.

In some embodiments, the different wavelengths of the broadband beam are deflected at different angles. The angle of the spatial deflection is defined by the refractive index of the employed dispersive material, the wavelength of the laser, and the bandwidth of the pulses. The divergence of the beam may, if applicable, be increased by imaging optics and correspondingly adjusted. Each wavelength can accordingly be assigned a specific solid angle in which this spectral component of the bandwidth propagates.

By calibrating the wavelength to the deflection angle and by knowing the installation position, the field of vision of the emitter may be ascertained in some embodiments. When part of the divergent beam contacts an obstacle, only a spectral portion is reflected by the angle dispersion. The reflected spectral portions that represent the reflected bandwidth can be determined by means of a spectrometer or a multi-spectral camera as the detector.

The measurement of the runtime between the emitter, i.e., the dispersive element, and detector may in some embodiments enable the distance to be measured between the object and emitter—which is termed the x-coordinate in this case—as is the case with all lidars. Depending on the x-coordinate and the size of the object, the bandwidth of the reflected spectral portion varies. Given a fixed size of the object, close objects yield a high-bandwidth of emitted radiation since, for example in an extreme case, the object is irradiated by all spectral portions. In contrast to this, very distant objects of the same size cause a narrowband reflected signal. If the reflected spectrum is then measured and if the x-coordinate is known, the y-coordinate, i.e., the spatial dimensions of the object, can be measured by the two spectral limits of the detected signal. The measuring principle in this case is similar to a polar coordinate system, whereby the object can clearly be characterized in x and y.

By a combination of many emitters and the use in a motor vehicle and in some embodiments, the entire environment of the motor vehicle may therefore be recorded. In this case, the small size of the glass-fiber-based emitters is beneficial, which allows hidden installation such as for example behind the windshield, in the A, B and C columns, or in headlamps. The synchronization of the individual emitters is also unproblematic. These can be triggered sequentially, and accordingly the environment can be detected at a delay in 360° in several planes around the vehicle.

The time delay between the individual emitters may for example be realized by different light runtimes in the fibers, or by the integration of optical delay lines.

Detection by means of a spectrally resolving detector may for example be accomplished by a commercially available spectrometer. An integration of a multispectral camera for detection is also possible. This would moreover also enable the environment to be detected by imaging.

Significant benefits of at least some embodiments of the method, or respectively the device and its use in a motor vehicle comprise, without limitation:

- a central light source and a central detector unit may be used,
- the emitters are arranged spatially distributed and may be simple and economical, may be designed to have small spatial dimensions and can be made of components suitable for mass production such as glass fibers, tapers and dispersive elements,
- an involved individual calibration of the sensors may be unnecessary; instead, the calibration may be accomplished centrally in a unit on the detector side, wherein the detector can detect many emitters during calibration,
- only the position and the field of vision must be known on the emitter side, i.e., the angle of radiation of the stretched pulses may be determined once during production,
- the light pulses may also be used for synchronization; accordingly, these pulses may be used as a clock for synchronization when using laser pulses with a stable repetition rate as a radiation source, such as mode-coupled, broadband, Q-switched or cavity-dumped pulses, for which, e.g. part of the light may be coupled out of the glass fiber and used by a photodiode as a trigger signal for time stamping so that the laser system can thus be used as a "clock" for the entire sensor,
- the elements of the system may be installed hidden, which has not been possible to date in any lidar,
- all of the beam deflection may be solid-state based; therefore there would be no movable parts,
- the optical signal and optical fibers may be used for signal transmission for other detector types so that one line may simultaneously be used for transmitting data from a plurality of sensor types such as radar, lidar and camera,
- the pulse laser may offer an easy way of determining the x-coordinate by means of time-of-flight measurement, the entire device may be designed economically,
  established technologies may be used that are available in mass production,
calibration may be conducted easily,
the synchronization of the individual emitters may also be conducted easily,
it is possible to use the radiation source to synchronize the plurality of sensor types,
the glass fiber lines may be used for transmitting signals for a plurality of detector types, and/or
hidden installation in the motor vehicle may be possible.
It is noted that not all embodiments, discussed herein may provide all of the aforementioned benefits.

The method and the device, as discussed herein using exemplary embodiments, may be used in all vehicles which include demanding driver assistance systems such as traffic jam pilot, highway pilot, and automated or autonomous driving. This also holds true for commercial vehicles and trucks.

Further embodiments are explained in greater detail in the following with reference to the drawings.

The exemplary lidar emission system 1 shown in FIG. 1 for a motor vehicle comprises a laser 2 that emits broadband light pulses. In doing so, the broadband laser pulse covers a given wavelength range of λ1 to λ2, wherein λ1>λ2. If it is therefore assumed that the emitted light pulses are white light, λ1 would lie in the red range and λ2 would lie in the blue range.

Within automotive use, the broadband light pulses tend to be those in the infrared range so that involved traffic participants in the environment of the motor vehicle will not be annoyed and/or blinded. The broadband pulses from the emitting laser 2 are fed to several optical splitters 4, so that a plurality of emitting optical sources is created. In the present example in FIG. 1, three splitters 4 are shown which yields four sources of optically coherent laser pulses, wherein the respective laser pulses are fed and forwarded through optical fibers 3. The optical laser pulses from the emitting splitters 4 are then each guided through optical fibers 3 to an associated optically dispersive element 5 which are formed for example by prisms in FIG. 1. In this case, prisms 5 can be used in the optically-visible as well as in the infrared range depending on the material used.

The optically dispersive elements 5 effectuate a spectral splitting of the respective broadband laser pulse so that a spectrally split stretched pulse 6 arises at the output of each dispersive element 5 and extends over a given angle 7 as a function of the dispersive element 5. This spectrally split stretched pulse 6 is primarily termed a spatial chirp, angular chirp, and more rarely a spatial chirp. In this case, the wavelengths participating in the broadband laser pulse are distributed over the angle 7 of the stretched pulse 6, which means that the frequency, or respectively wavelength changes over the range of the angle 7 of the stretched pulse 6. In the event of white light, the wavelengths of the stretched pulse 6 would change from red to blue across the angle 7. In other words, the bandwidth of the laser pulse is spatially divided across the angle 7.

Figure 2:
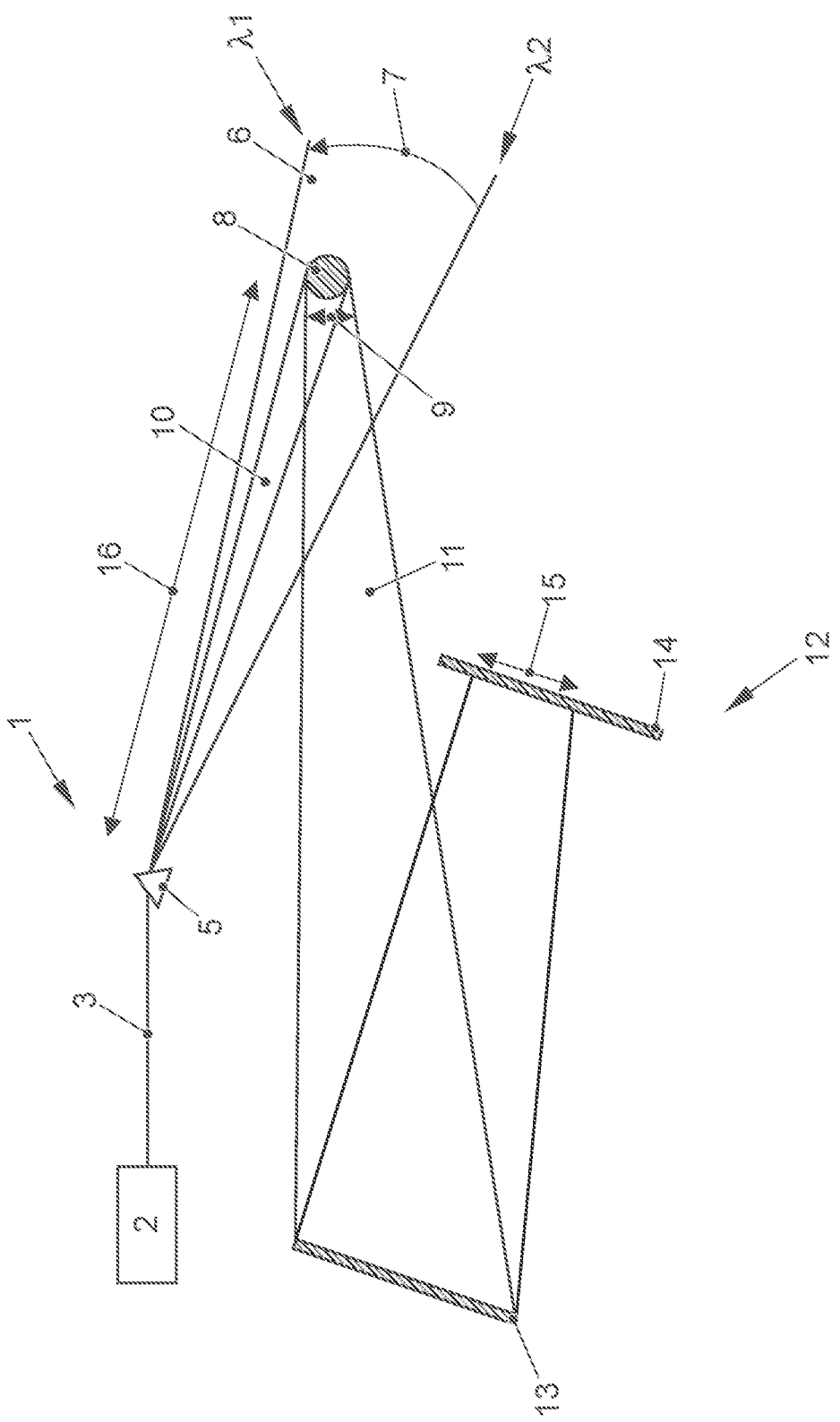
FIG. 2 shows a schematic representation of the detection of the width of an object illuminated by the lidar emission system.

FIG. 2 shows the detection of the width of an object 8 illuminated by the lidar emission system 1 such as an obstacle, wherein the lidar system 1 in this exemplary embodiment is shown simplified, and comprises the laser 2, a fiber 3 transporting the broadband laser pulses as well as a dispersive element 5 that is realized by a prism to which the laser pulses are guided by means of the fiber 3. The prism effectuates a spectral splitting up of the broadband laser pulses into a stretched pulse 6 across an angle 7 defined by the prism, wherein in FIG. 2, the spectral distribution over the stretched pulse 6 is symbolized by the wavelength range λ1 to λ2 as in FIG. 1.

In other words, the broadband laser pulse is dispersed by the prism across the angle 7, whereby the different wavelengths of the laser pulse are separated in the plane of the stretched pulse 6.

An object 8 that has a width 9 is arranged in the beam path of the stretched pulse 6. The object 8 is then irradiated by a subsection of the stretched pulse 6 over its width 9 by different wavelengths of the subsection 10, wherein the subsection 10 has the wavelength distribution AA, in other words, forms a section of the wavelength distribution λ1 to λ2 of the stretched pulse 6. Given its width 9, the object 8 reflects the subsection 10 of the light field 6 and generates a reflected subsection 11 that has the reflected wavelength range Δλ which is fed to a spectrometer 12. In this case, the spectrometer 12 comprises at least one grid 13 as well as an optical sensor 14, for example a CCD sensor. The subsection 11 with the reflected wavelength range Δλ reflected by the object 8 into the spectrometer 12 is imaged by the grid 13 on the CCD sensor 14 as a function of its participating wavelengths and generates an image of the width 15 as a function of the wavelength range Δλ participating in the reflection. The width 15 measured by the CCD sensor corresponds to the wavelength range Δλ of the reflected subsection 11 and is therefore a direct measure of the width 9 of the object 8.

In order to be able to determine the actual width 9 of the object 8, the distance 16 of the object 8 from the pulse emitter, i.e., from the dispersive element 5, must be known in addition to the measured wavelength distribution AA of the reflected subsection 11. Since a pulsed laser 2 is used, the pulse length and the repetition frequency are known so that the distance 16 can be expressed by means of a time-of-flight measurement as:

$$\Delta x = c \cdot \Delta t,$$

wherein Δt is the measured runtime of the stretched pulse 6 between the dispersive element 5 and the object 8, and c means the speed of light. The width of the object 6 then results as a function of the distance Δx and the measured wavelength range Δλ of the reflected subsection 11 and can be expressed as:

$$\Delta y = f(\Delta \lambda, \Delta t).$$

Comparable to a polar coordinate system with a radius and an angle, the distance Δx with reference number 16 corresponds to a radius, and the wavelength range Δλ corresponds to an angle. In this manner, the object 8 can be completely described by means of its width 9 and its distance 16 in the environment of a motor vehicle (not shown).

REFERENCE NUMBER LIST

1 Lidar emission system
2 Laser
3 Optical fiber
4 Splitter
5 Dispersive element
6 Stretched pulse
7 Angle
8 Object
9 Width of the object
10 Subsection
11 Reflected subsection
12 Spectrometer 13 Grid
14 CCD
15 Image width
16 Distance
λ1 Wavelength
λ2 Wavelength The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

What is claimed is:

1. A method for detecting an object using broadband laser pulses with a given bandwidth and wavelength distribution, pulse duration and repetition frequency having the steps:
    emitting broadband laser pulses:
    generating a stretched pulse that illuminates a given angle from each broadband laser pulse by applying an angle dispersion to the broadband laser pulse via a dispersive element, whereby the different wavelengths of the broadband laser pulse are spread into different angles;
    detecting a reflected subsection of the stretched pulse which is reflected by the object arranged in the stretched pulse;
    determining the wavelengths in the reflected subsection of the stretched pulse;
    determining the runtime of the stretched pulse from the dispersive element to the object using a time-of-flight method; and
    determining the distance and the width of the object as a function of the runtime of the stretched pulse and the wavelength range of the reflected subsection of the stretched pulse.

2. The method according to claim 1, wherein the wavelengths of the broadband laser pulses are within a range of 400 nm to 4 μm.

3. The method according to claim 1, wherein the illuminated angle of the stretched pulse is between 0.1° to 180°.

4. The method according to claim 1, wherein a calibration of the wavelengths in the stretched pulse to the angle of spatial deflection generated by the angle dispersion is conducted.

5. The method according to claim 1, wherein the wavelength range of the reflected subsection is determined by the spectral limits of the reflected subsection.

6. A device for detecting an object using broadband laser pulses with a given wavelength distribution, pulse duration and repetition frequency, wherein the device is configured and designed to perform the method according to claim 1, having:
    a LIDAR system for generating broadband laser pulses;
    at least one dispersion apparatus for applying an angle dispersion to the laser pulses to generate stretched pulses;
    a spectral detector for determining the wavelengths in the reflected subsection of the stretched pulse;
    an apparatus for determining the runtime of the stretched pulse between the at least one dispersion apparatus and the object; and
    an apparatus for determining the distance and the width of the object relative to the at least one dispersion apparatus from the runtime and the wavelength range of the reflected subsection of the stretched pulses.

7. The device according to claim 6, wherein the dispersion apparatus is formed by a dispersive element.

8. The device according to claim 6, wherein the spectral detector is formed by one of a spectrometer and a multi-spectral camera.

9. The device according to claim 6, wherein the device has a plurality of splitters which split up the laser pulses into corresponding laser pulses.

10. The device according to claim 9, wherein a plurality of dispersion apparatuses generates a plurality of stretched pulses from the plurality of laser pulses, so that the generated stretched pulses can be used to detect objects in different spatial regions.

11. The device according to claim 6, wherein the laser pulses are guided through optical fibers to the dispersion apparatuses.

12. A motor vehicle comprising the device according to claim 6 for determining objects in the environment of the motor vehicle.

* * * * *